United States Patent
Singh et al.

(10) Patent No.: US 10,037,315 B2
(45) Date of Patent: Jul. 31, 2018

(54) USING FORM FIELDS AS DIMENSIONS TO DEFINE CONSUMER SEGMENTS FOR WHICH FORM INTERACTIVITY METRICS CAN BE ANALYZED

(71) Applicant: Adobe Systems Incorporated, San Jose, CA (US)

(72) Inventors: Harpreet Singh, Chandigarh (IN); Arvind Heda, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 329 days.

(21) Appl. No.: 14/603,774

(22) Filed: Jan. 23, 2015

(65) Prior Publication Data
US 2016/0217118 A1 Jul. 28, 2016

(51) Int. Cl.
*G06F 17/00* (2006.01)
*G06F 17/24* (2006.01)
(Continued)

(52) U.S. Cl.
CPC ........ *G06F 17/243* (2013.01); *G06F 11/3065* (2013.01)

(58) Field of Classification Search
CPC .......... G06F 17/00; G06F 17/30; G06F 3/048; G06F 11/3065; G06F 17/243; G06T 11/20
(Continued)

(56) References Cited

U.S. PATENT DOCUMENTS 7,941,525 B1 * 5/2011 Yavilevich ............. G06Q 30/02
709/203
8,866,818 B2 * 10/2014 Rubin ................... G06T 11/206
345/440
(Continued)

OTHER PUBLICATIONS

Kirmani ("Product Review: Mobile Prototyping and Testing with Justinnnind", published on line on Oct. 8, 2012 at https://www.uxmatters.com/mt/archives/2012/10/product-review-mobile-prototyping-and-testing-with-justinnnind.php, hereafter Kirmani' 2012 (Year: 2012).*
(Continued)

*Primary Examiner* — Cesar B Paula
*Assistant Examiner* — Jian Huang
(74) *Attorney, Agent, or Firm* — Finch & Maloney PLLC

(57) ABSTRACT

Improved authoring techniques enable digital forms to be configured so as to facilitate subsequent analysis of how specific consumer segments interact with such forms. As a form author defines and manipulates the fields that comprise a form, selected fields can be designated as dimensions across which metrics can be analyzed. Depending on the particular type of data being collected, author-designated dimensions are optionally transformed into more meaningful categories. For instance, a "household income" field can be transformed into lower- and higher-income segments. If the form author wishes to later analyze metrics such as interaction time and errors encountered, consumers can be segmented on the basis of such dimensions. For example, the form author may understand which income segment requires the most time to complete a form. In general, this provides information with respect to how certain segments interact with a digital form, thereby enabling form authors to improve consumer experience.

20 Claims, 11 Drawing Sheets

(51) Int. Cl.
*G06F 11/30* (2006.01)
*G06F 21/00* (2013.01)

(58) Field of Classification Search
USPC .......................................... 715/222; 345/411
See application file for complete search history.

(56) References Cited

U.S. PATENT DOCUMENTS

| | | | | |
|---|---|---|---|---|
| 2008/0140481 A1* | 6/2008 | Gold | ................ | G06Q 30/02 705/7.29 |
| 2010/0318527 A1* | 12/2010 | Nandy | ................ | G06F 3/0484 707/754 |
| 2012/0296682 A1* | 11/2012 | Kumar | ................ | G06Q 10/00 705/7.11 |
| 2013/0232401 A1* | 9/2013 | Daga | ................ | G06F 17/243 715/225 |
| 2014/0040718 A1 | 2/2014 | Rein et al. | | |
| 2014/0129457 A1* | 5/2014 | Peeler | ................ | G06Q 30/018 705/317 |
| 2014/0289074 A1* | 9/2014 | White | ................ | G06Q 30/0629 705/26.41 |
| 2015/0310497 A1* | 10/2015 | Valin | ................ | G06Q 30/0269 705/14.66 |

OTHER PUBLICATIONS

Justinmind, ("Justinmind Prototype User Guide", published in 2013, online at http://community.mis.temple.edu/mis3504smmer12013/files/2013/06/justinmind_prototyper_userguide.pdf , hereafter Justinmind'2013 (Year: 2013).*

ClickTale, "Basic System Manual", published in Feb. 1, 2013, at http://demos.clicktale-samples.com/Materials/Product/ClickTale%20User%20Guide%20April%202013.pdf, hereafter ClickTale'2013 (Year: 2013).*

* cited by examiner

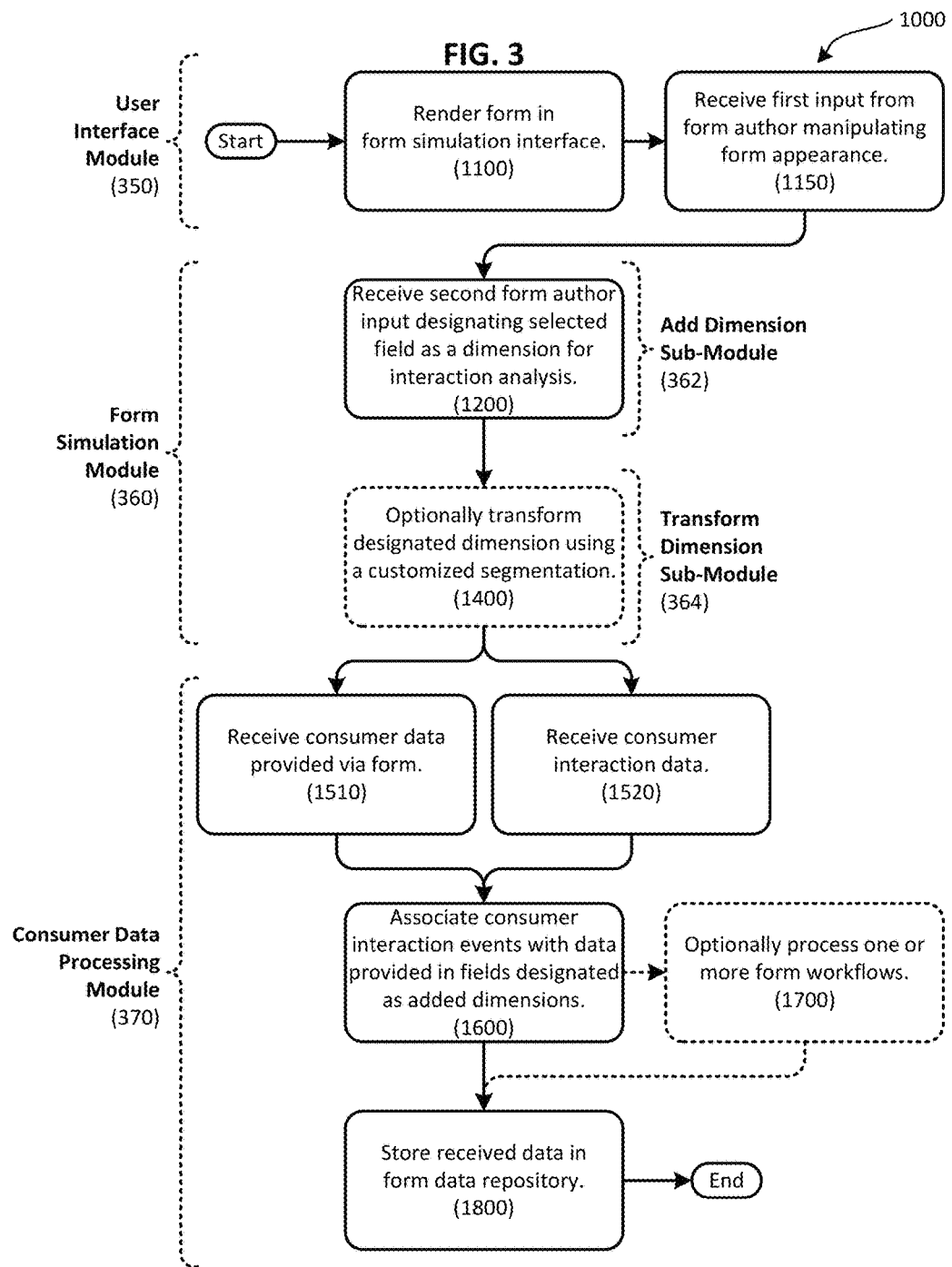

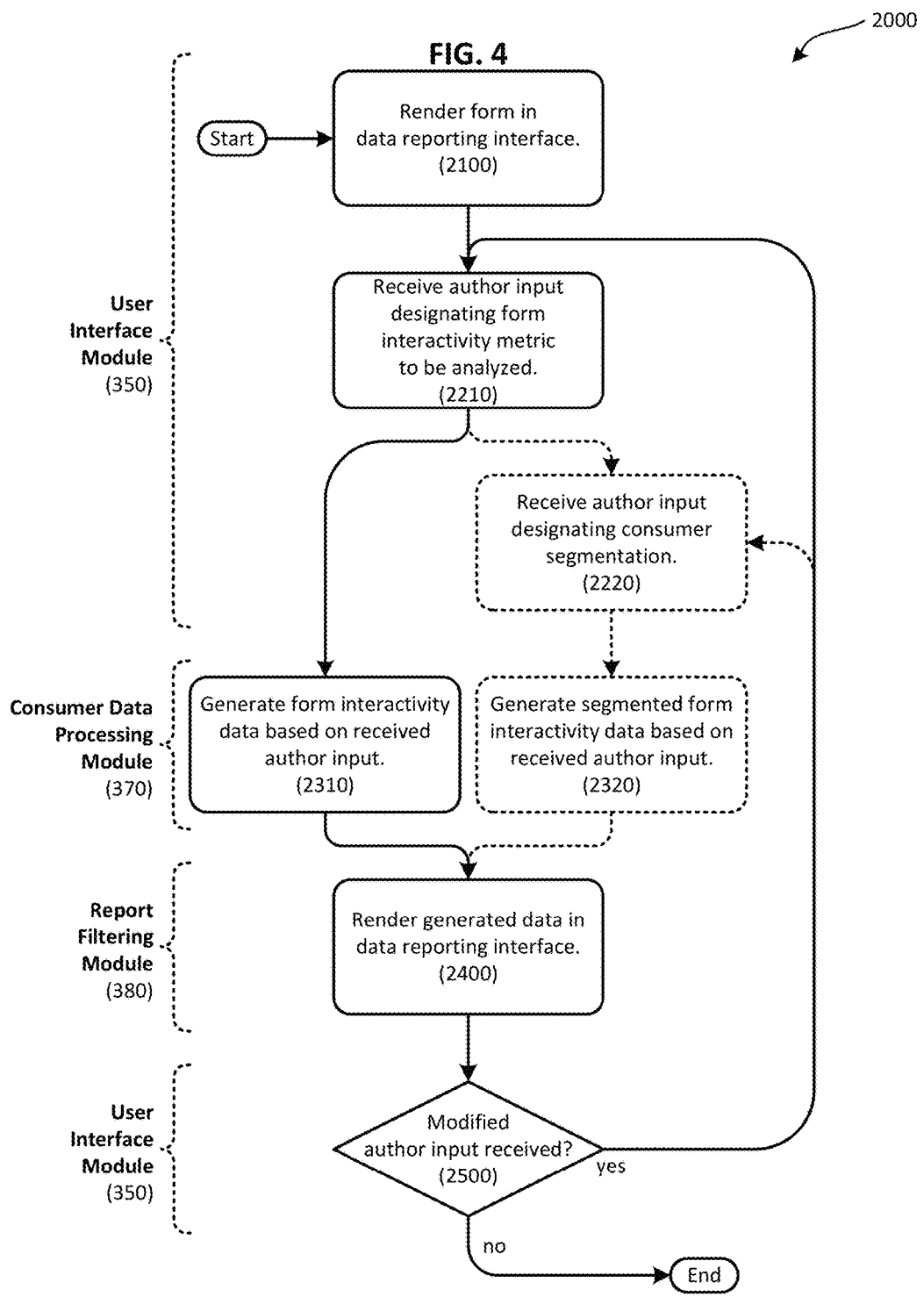

| Example | Consumer Interaction Event | Fields Designated as Added Dimensions | Example Payload |
|---|---|---|---|
| 1 | Validation Failure on Name Field | state<br>salary_segment | `</Sample_Event>`<br>{<br>   event            : "Validation Failure",<br>   form_name     : "Enrollment Form",<br>   field_name    : "Enrollment Form::Name",<br>   state           : "California",<br>   salary_segment : "Middle-Income"<br>{<br>`</Sample_Event>` |
| 2 | Validation Failure on Name Field | (none) | `</Sample_Event>`<br>{<br>   event            : "Validation Failure",<br>   form_name     : "Enrollment Form",<br>   field_name    : "Enrollment Form::Name"<br>{<br>`</Sample_Event>` |
| 3 | Help Request on Name Field | state<br>salary_segment | `</Sample_Event>`<br>{<br>   event            : "Help Request",<br>   form_name     : "Enrollment Form",<br>   field_name    : "Enrollment Form::Name",<br>   state           : "California",<br>   salary_segment : "Middle-Income"<br>{<br>`</Sample_Event>` |
| 4 | Time Spent | state | `</Sample_Event>`<br>{<br>   event            : "Time Spent",<br>   value           : "35 seconds",<br>   form_name     : "Enrollment Form",<br>   field_name    : "Enrollment Form::Name",<br>   state           : "California"<br>{<br>`</Sample_Event>` | ural
USING FORM FIELDS AS DIMENSIONS TO DEFINE CONSUMER SEGMENTS FOR WHICH FORM INTERACTIVITY METRICS CAN BE ANALYZED

FIELD OF THE INVENTION

This disclosure relates generally to data collection and analysis, and more specifically to methods for configuring digital forms in a way that facilitates understanding how consumers interact with such forms.

BACKGROUND

The use of digital forms allows organizations to extend conventional paper-based forms and workflows to the online realm, and in particular, to web and mobile channels. This improves consumer experience, increases workflow efficiency and responsiveness, and extends organizational reach by supplementing the diversity of services offered to consumers. For example, digital forms are often used in a wide range of applications, such as for enrolling consumers in programs and services, capturing data from employees and collaborators, integrating captured data into existing systems and workflows, and generating personalized and secure digital documents. Thus digital forms can be understood as providing a degree of "digital self-service" that allows consumers to perform otherwise complex tasks such as opening a bank account, applying for a mortgage, purchasing an insurance policy, registering for a government pension, and the like. For digital self-service to be successful, an organization should deliver an intuitive, streamlined, and efficient experience for consumers, regardless of the type of computing platform that is used to interact with the form, and regardless of the complexity of the task at hand. This includes making it easy for consumers to find and complete the right form regardless of whether such form is accessed via a desktop computer, a tablet computer, a smartphone, or another type of computing device. It also includes providing consumers with timely and accurate status information during the processing of a form. The captured data should be reposed in a way that allows for easy retrieval and analysis by consumers and organizational stakeholders alike. In general, extending the use of digital forms to more complex workflows calls for a robust enterprise platform that leverages existing systems and data while offering multiple ways to communicate with the consumers who interact with such forms.

BRIEF DESCRIPTION OF THE DRAWINGS

FIG. 3 is a flowchart illustrating an example form publication and submission method that can be used by a form author to designate a selected field as a dimension for subsequent analysis of how consumers interact with an authored form.

FIG. 4 is a flowchart illustrating an example form interaction analysis method that can be used by a form author to display segmented form interactivity data on an authored form.

FIGS. 5A and 5B are screenshots illustrating example form simulation interfaces that allows a form author to designate a selected field as a dimension for subsequent analysis of how a consumer interacts with a digital form.

FIG. 8 illustrates a table listing example payloads for various consumer interaction events triggered from the Enrollment Form of FIG. 5A, wherein certain fields (or no fields) are designated as added dimensions for purposes of analyzing such events.

DETAILED DESCRIPTION

Figure 1:
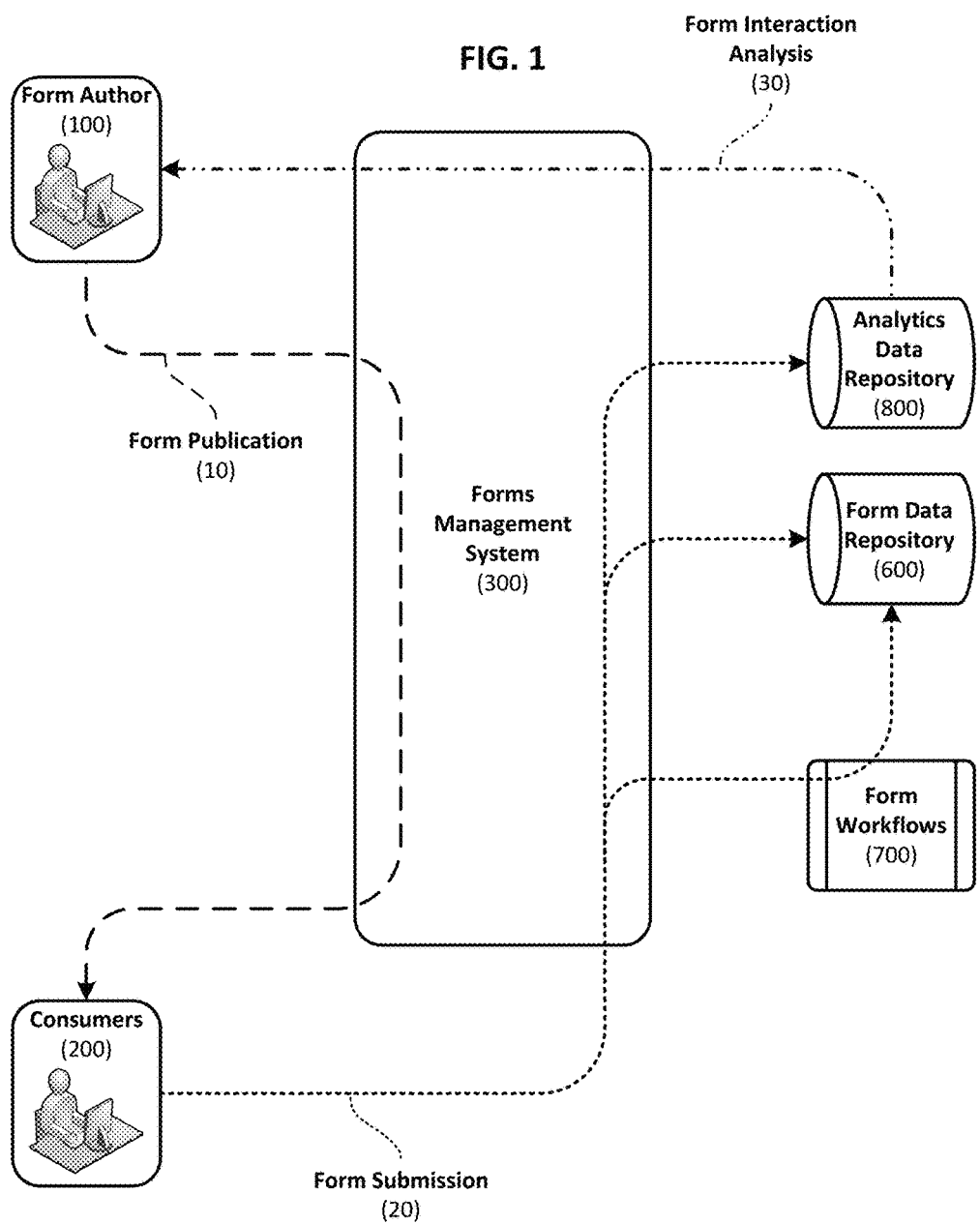
FIG. 1 is a schematic illustration of an example digital form deployment topology that can be used to configure digital forms in a way that facilitates understanding how consumers interact with such forms.

One important feature of digital forms is that they facilitate the analysis of consumer interactions with the form. In particular, existing form authoring tools enable a form author to capture and track performance metrics relating to the ways in which consumers use a form, the types of devices and software consumers use to interact with a form, and the like. For example, the time spent filling a form, the number of errors encountered while interacting with a form, and the number of help requests submitted while completing a form can all be tracked and analyzed. Analyzing metrics such as these allows a form author to make informed decisions with respect to improving form design, functionality, and workflows. While this ultimately allows the form author to improve consumer experience, there are still a number of opportunities to further enhance existing form authoring tools.

For instance, existing form authoring tools lack the ability to configure the various fields that comprise a form as dimensions across which meaningful metrics can be analyzed. For example, in the context of a form configured to receive a consumer's immigration status as a dimension, it would be useful to analyze metrics such as interaction time, errors encountered, and help requests in terms of consumer segments that are based on immigration status. More specifically, it would be useful to analyze such metrics in terms of consumers who are citizens, permanent residents, temporary residents, tourist visa holders, and the like. While existing data analysis tools allow analysts to define and manipulate custom dimensions based on data collected from a form, such functionality is unavailable to form authors in the context of an interface configured to author the from that actually collects such data. As a result, a form author who wishes to improve a form workflow for a particular consumer segment does not have access to the same data analysis tools that are available outside the context of the form authoring environment. Integrating the tools used for designing forms and analyzing the data collected using such forms allows a form author to act as a data analyst as well, thereby making the form authorship process more efficient and allowing form authors to more closely tailor their forms to specific consumer segments.

Thus, and in accordance with certain of the embodiments disclosed herein, improved form authoring techniques enable forms to be configured in a way that facilitates subsequent analysis of how specific consumer segments interact with the authored forms. For example, as a form author defines and manipulates the various fields that comprise a form, selected fields can be designated as dimensions across which various metrics can be analyzed. Depending on the particular type of data being collected from a consumer, author-designated dimensions are optionally transformed into more meaningful categories. For instance, a numerical "household income" field can be transformed into low-, middle-, and high-income consumer segments. As a result, if the form author wishes to later analyze metrics such as interaction time, errors encountered, and help requests, consumers can be segmented on the basis of the previously designated dimensions. For example, the form author may gain insight into which income segment tends to require the most time to complete a given form. In general, this provides more detailed information with respect to how certain consumer segments interact with a digital form, and thus enables form authors to create more efficient and intuitive consumer experiences.

Figure 6:
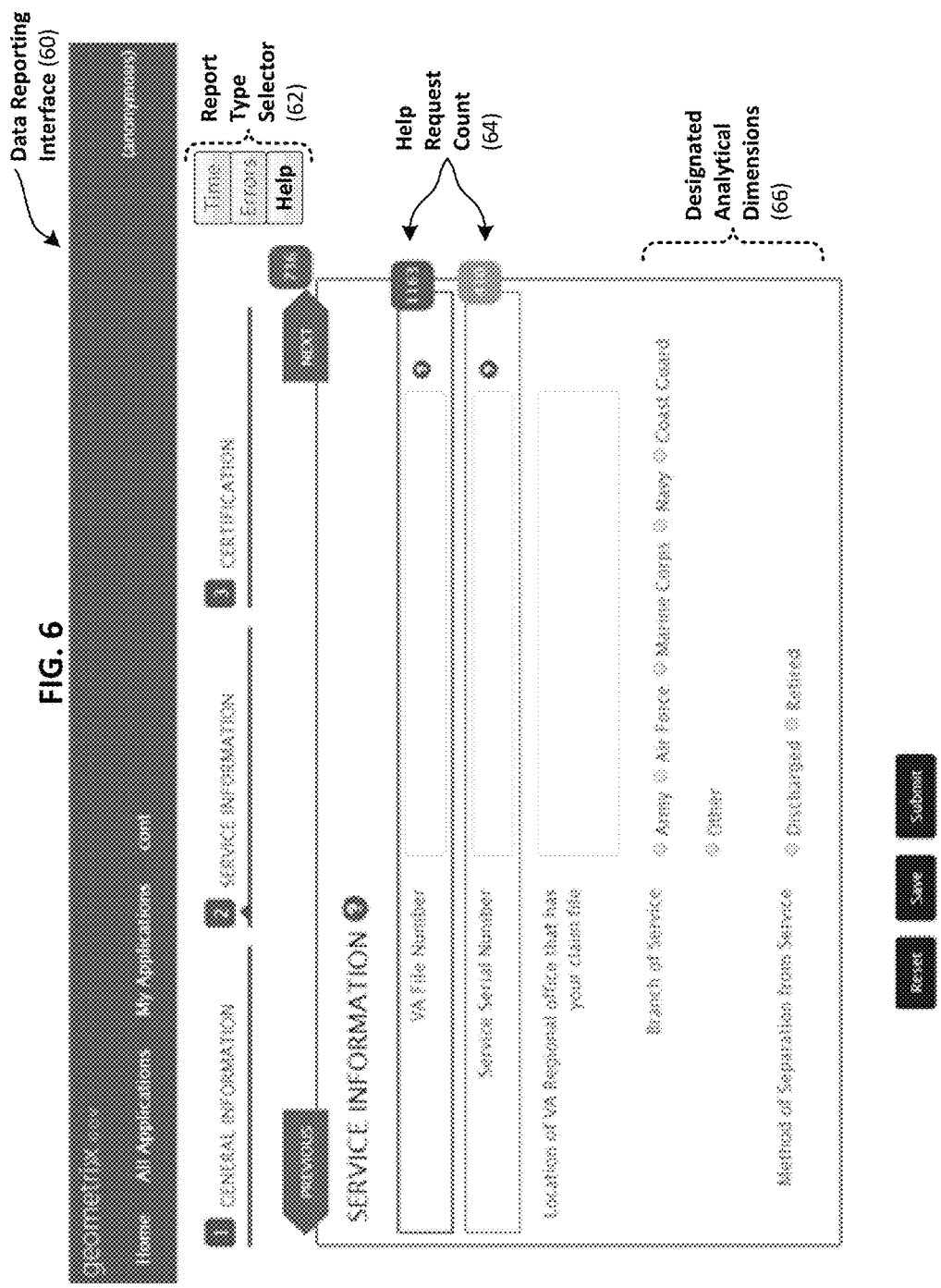
FIG. 6 is a screenshot illustrating an example data reporting interface wherein help request counts are displayed adjacent to corresponding fields, and wherein the help request counts are for a global dataset spanning an entire consumer population.
Figure 7A:
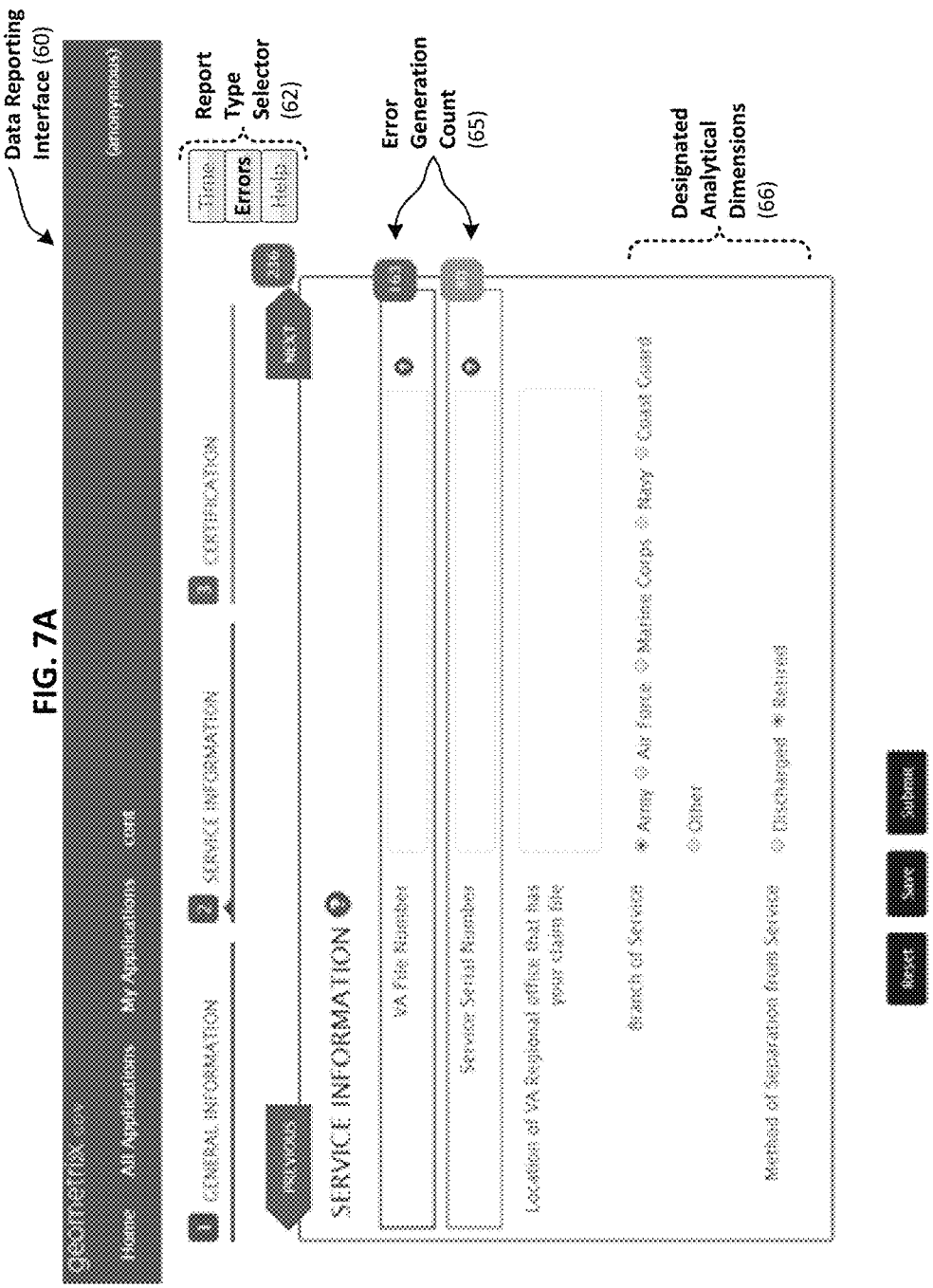
FIG. 7A is a screenshot illustrating an example data reporting interface wherein error generation counts are displayed adjacent to corresponding fields, and wherein the error generation counts are for a segment of the consumer population comprising only retired Army veterans.
Figure 7B:
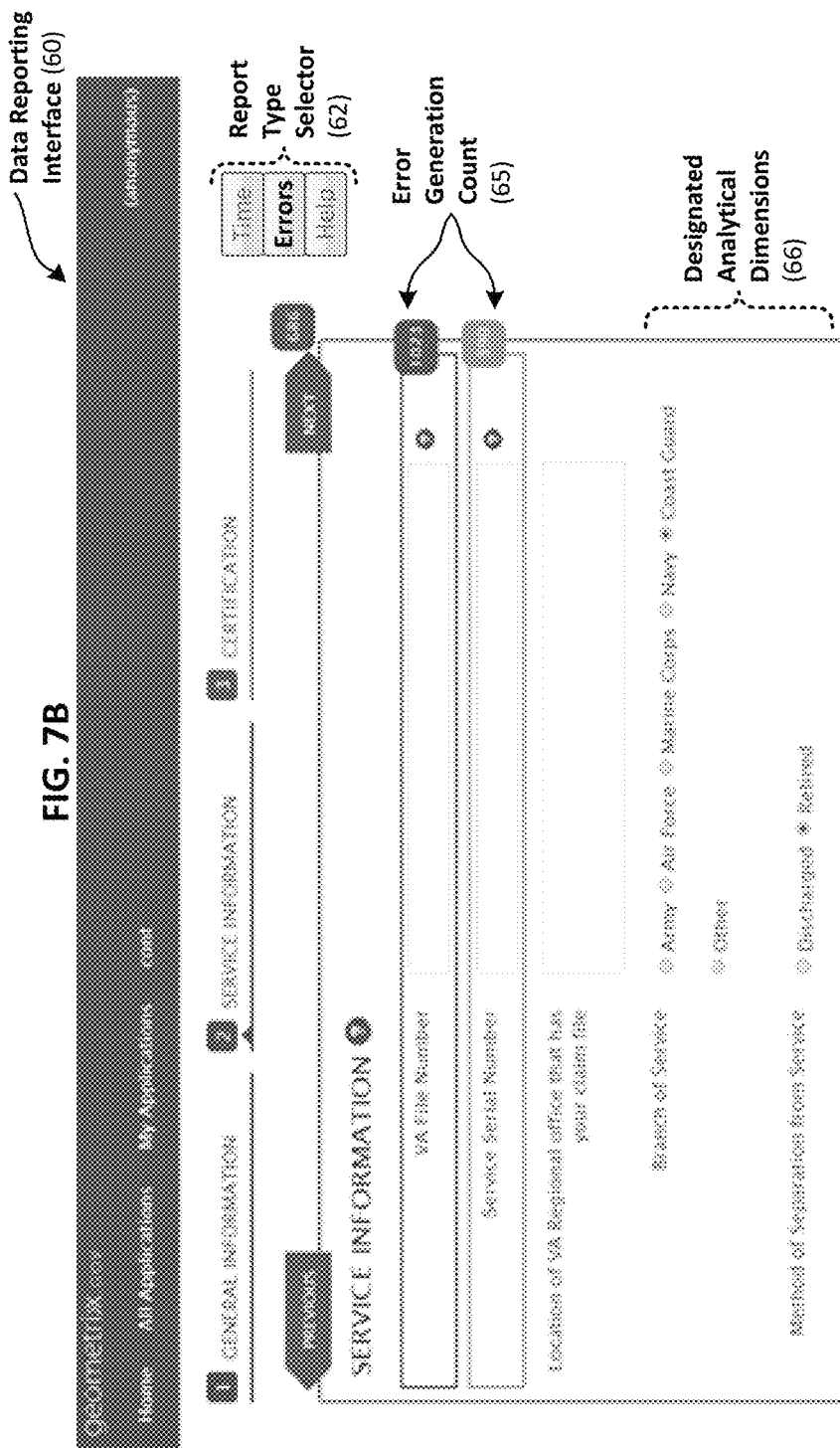
FIG. 7B is a screenshot illustrating an example data reporting interface wherein error generation counts are displayed adjacent to corresponding fields, and wherein the error generation counts are for a segment of the consumer population comprising only retired Coast Guard veterans.

Providing analytical data directly on a copy of the form itself also advantageously provides a form author with a close approximation of a consumer's form filling experience. For example, FIG. 6 illustrates an example data reporting interface wherein help request counts are displayed adjacent to corresponding form fields. In particular, FIG. 6 illustrates that an especially large number of help requests were submitted in conjunction with the "VA File Number" field, thus indicating that this field may be confusing to a large number of consumers. While FIG. 6 illustrates an interactivity metric (a help request count) for an entire population of consumers interacting with a form, in alternative embodiments form author may wish to segment these statistics and view form interactivity metrics for only a particular segment of the consumer population. This points out yet another advantage of reporting interactivity metrics directly on a copy of the form itself: the form author can define a desired segmentation using the from elements themselves. For example, if a form author wishes to view error generation counts for only retired Army veterans, he/she can select the appropriate previously-designated analytical dimensions, such as illustrated in FIG. 7A. Likewise, FIG. 7B illustrates error generation counts for retired Coast Guard veterans. The error generation counts shown in FIGS. 7A and 7B indicate that the "VA File Number" field is problematic for retired Coast Guard veterans, but not for retired Army veterans, thus suggesting an aspect of the form which might be evaluated for possible improvement. In certain embodiments consumers can be segmented based on different form versions generated for different devices that are used to interact with the form. Numerous configurations and variations will be apparent in light of this disclosure.

FIG. 1 is a schematic illustration of an example digital form deployment topology that can be used to configure digital forms in a way that facilitates understanding how consumers interact with such forms. Such a topology can be understood as a cyclical process in which a form author 100 and form consumers 200 leverage services provided by a forms management system 300. For example, form author 100 generates a digital form by defining one or more data input fields arranged in a graphical layout. Form author 100 optionally designates one or more fields as dimensions across which various form interactivity metrics can be measured. Once the authoring process is complete, the form can be rendered for consumers 200 in a form publication process 10. Consumers 200 provide data to a form data repository 600 and/or one or more form workflows 700 in a form submission process 20. In certain embodiments form submission process 20 also leverages services provided by forms management system 300 to configure and populate an analytics data repository 800 that stores data that characterizes how consumers interact with the authored form. This enables form management system 300 to leverage the data stored in analytics data repository 800 so as to allow form author 100 to understand how consumer segments defined by the designated dimensions have interacted with the published form. This form interaction analysis process 30 enables form author 100 to manipulate the authored form in a way that provides a more efficient and intuitive consumer experience. The manipulated form can then be published, thus reiterating the cyclical process.

As used herein, the term "digital form" (or "form") refers, in addition to its ordinary meaning, to a collection of binary information that, when rendered, can be used to collect data from a consumer. A digital form can be understood as comprising one or more fields that, when interacted with by a consumer, result in the collected consumer data. Examples of fields include text entry boxes, dropdown menus, and radio buttons, although in general, any suitable user interface elements capable of collecting data from a consumer may be used in this regard. Digital forms and their constituent fields can be rendered in a variety of different ways, such as via display on a screen, by printing using an output device, or aurally using an audio player and/or text-to-speech software. A digital form may encompass information directly consumed by a user such as when it is displayed or otherwise rendered using a suitable content browser or document viewer. A digital form may also include information that is not specifically intended for display and therefore also encompasses items such as software, executable instructions, scripts, hyperlinks, addresses, pointers, metadata, audio data, and formatting information. A consumer can interact with a digital form in any suitable manner, such as by using pointer- and/or text-based user interface devices, examples of which include a mouse, a keyboard, and a touch sensitive display. Audio and visual input/output devices, such as cameras and microphones, can also be used to interact with a digital form. A digital form can be embodied on a computer readable medium, and can be communicated amongst users by a variety of techniques including wired and/or wireless transmission of digital data.

As used herein, the term "form author" (or "author") refers, in addition to its ordinary meaning, to a user, entity, or software application instance that generates, designs, manages, analyzes, or revises a digital form, or that otherwise represents the source of a digital form in a workflow. Likewise, the term "form consumer" (or "consumer") refers, in addition to its ordinary meaning, to a user, entity, or software application instance that receives, provides data via, or interacts with a digital form, or that otherwise represents the target of a digital form in a workflow. Thus, in a generalized workflow a form author can be understood as generating a form that is subsequently published to a form consumer who reviews and provides data via the published form. In certain embodiments a different user may perform different tasks associated with a form author or consumer. Thus, for example, in a particular implementation wherein a first user generates a form and a second user analyzes user interaction data for the generated form, both the first and second users may be considered a form author. In general, the terms author and consumer are not limited to people or users, but may also refer to entities, organizations, workstations, computing devices, or software application instances which originate or receive digital forms as part of a workflow. A given workflow may not necessarily involve the form itself being transmitted from author to consumer; in some cases other data relating to a form, such as metadata and/or a network address, may instead be transmitted between the author and the consumer.

As used herein, the term "form interactivity metric" refers, in addition to its ordinary meaning, to a standard for measuring, assessing, or otherwise evaluating how consumers interact with a digital form. Examples of form interactivity metrics include time spent interacting with a form or a form subsection, number of errors generated while interacting with a form or form subsection, and number of help requests fielded while interacting with a form or form subsection. Other form interactivity metrics can be used in other embodiments. Form interactivity metrics can be expressed in terms of an absolute quantity (for example, 1163 errors generated) or a rate (for example, 10.15 errors generated per 100 forms submissions). Thus other examples of form interactivity metrics include a form submission rate or an in-progress rate quantifying a proportion of forms that are in an interim saved state, but which have not yet been submitted. Form interactivity metrics can also be expressed for an entire population of consumers who have interacted with a form, or can be expressed for a smaller segment of such population, such as only those consumers from a particular geographical region or falling within a particular household income bracket. Thus, in certain embodiments, the from interactivity metric can be understood as a quantifier that numerically evaluates, either using an absolute value or a rate, the occurrence of a consumer interaction with a digital form.

As used herein, the term "dimension" refers, in addition to its ordinary meaning, to a category of data, for example such as may be collected using a digital form. In the demographic context, example dimensions include postal code, household income, age, and ethnicity. In the technological context, example dimensions include browser type, operating system type, and screen resolution. Dimensions can be used to characterize and/or segment the consumers that interact with a form. Such characterization and/or segmentation is optionally made based on data provided by consumers via the form itself. For instance, a form that collects demographic data such as name, address, and household income can be used to segment consumers interacting with the form on the basis of country, postal code, or income level, respectively. As described herein, a consumer segment can be defined on the basis of a common characteristic that is shared amongst members of the segment.

System Architecture

Figure 2:
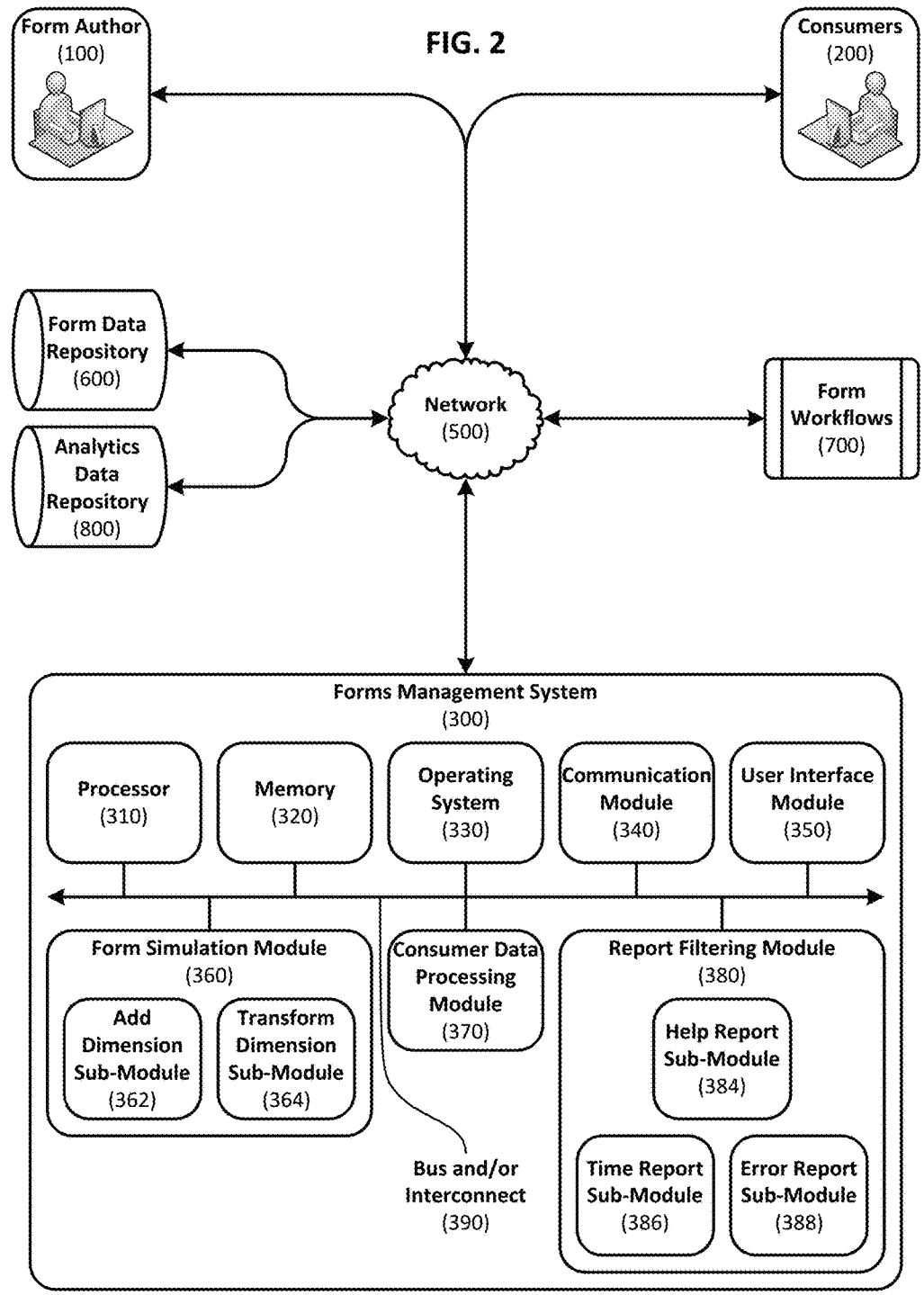
FIG. 2 is a block diagram schematically illustrating an example networked computer system that can be used to configure digital forms in a way that facilitates understanding how consumers interact with such forms.

FIG. 2 is a block diagram schematically illustrating an example networked computer system that can be used to configure digital forms in a way that facilitates understanding how consumers interact with such forms. More specifically, the system illustrated in FIG. 2 can be understood as enabling form author 100 and form consumers 200 to interact with each other and leverage services provided by forms management system 300. In such embodiments, form author 100 and form consumers 200 communicate with each other, and communicate with forms management system 300 via a network 500. Network 500 can also be used to access supplementary services and resources, such as form data repository 600, form workflows 700, and/or analytics data repository 800. Additional or alternative services and resources may be provided in other embodiments. In some cases one or more of such services and resources may be integrated into and provided by forms management system 300, as will be described in turn. Thus other embodiments may have fewer or more networks, services, and/or resources depending on the granularity of implementation. It will therefore be appreciated that the embodiments disclosed herein are not intended to be limited to the provision or exclusion of any particular services and/or resources.

As illustrated in FIG. 2, form author 100 and form consumers 200 each have access to a device that facilitates interaction with other users and/or components of the various systems that are illustrated in FIG. 2 or are otherwise described herein. For example, in certain embodiments form author 100 and form consumers 200 each have access to one or more of a variety of suitable computing devices, including devices such as desktop computers, laptop computers, workstations, enterprise class server computers, handheld computers, tablet computers, cellular telephones, smartphones, and set-top boxes. Other devices may be used in other embodiments. The devices used by form author 100 and/or form consumers 200 optionally include a wired and/or wireless communication adapter that enables communication via network 500. The devices also optionally include input/output components such as one or more of a tactile keyboard, a display, a touch sensitive display, a microphone, a camera, and location services. Such input/output components allow form author 100 and form consumers 200 to not only control operation of their own respective devices, but also to control certain operational aspects of forms management system 300.

For example, in one implementation form author 100 represents a military benefits administrator who is in charge of designing and managing an online benefits application. Consumers 200 represent military veterans who will use the application to apply for benefits. Form author 100 leverages services provided by forms management system 300 to design the various forms and workflows 700 that consumers 200 will interact with during the application process. In the course of designing these forms and workflows 700, form author 100 designates certain fields as dimensions that can be used to segment the population of consumers 200. For example, a form may include a selection field that prompts an applicant to indicate his/her branch of service. Form author 100 can designate this field as a dimension upon which subsequent consumer interaction analysis can be based, as will be described in turn. When form author 100 is finished designing the forms and workflows 700 that comprise the application, the forms are published for use by consumers 200. This can be accomplished, for example, by publishing the online benefits application on a webpage that provides resources for veterans.

As consumers 200 interact with the forms that comprise the online benefits application, forms management system 300 collects observational data characterizing such interactions. In certain embodiments such data is stored in analytics data repository 800. For example, in one implementation forms management system 300 collects data indicating how long consumers 200 interact with certain forms or form fields, how often errors are generated as a result of such interactions, and how often consumers 200 access online or embedded help resources associated with certain forms or form fields. Form author 100 can review form interactivity metrics such as these either in terms of the entire population of consumers 200, or on the basis of smaller consumer segments. Such segments can be defined based on consumer-provided values entered using the fields previously marked by form author 100 as dimensions. For instance, if the aforementioned branch of service field is designated as a dimension, form author 100 can separately review how often Coast Guard veterans request help with a particular form, form subsection, or field, as opposed to Army, Navy, or other veterans. This data is optionally revealed in a data reporting interface that simulates how the form appears to consumers 200. Segmenting form interactivity metrics in this way provides form author 100 with more detailed information with respect to how certain consumer segments interact with a particular form, and thus enables form author 100 to create a more efficient and intuitive consumer experience.

Referring still to the example embodiments illustrated in FIGS. 1 and 2, forms management system 300 can be configured to manage and orchestrate one or more of the aforementioned form publication process 10, form submission process 20, and form interaction analysis process 30. To this end, forms management system 300 includes one or more software modules configured to implement certain of the functionalities disclosed herein, and optionally further includes hardware configured to enable such implementation. This hardware may include, but is not limited to, a processor 310, a memory 320, an operating system 330, and a communication module 340. Processor 310 can be any suitable processor, and may include one or more coprocessors or controllers, such as an audio processor or a graphics processing unit, to assist in processing operations of forms management system 300. Memory 320 can be implemented using any suitable type of digital storage, such as one or more of a disk drive, a universal serial bus drive, flash memory, and/or random access memory. Operating system 330 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with forms management system 300, and therefore may also be implemented using any suitable existing or subsequently developed platform. Communication module 340 can be any appropriate network chip or chipset with allows for wired and/or wireless communication via network 500 to one or more of the other components described herein. A bus and/or interconnect 390 may also be provided to allow for inter- and intra-device communications using, for example, communication module 340.

In certain embodiments forms management system 300 includes a user interface module 350 that is configured to provide a user interface that is capable of displaying information to, and receiving information from, a user of forms management system 300. For example, in one implementation user interface module 350 provides a form design interface that is capable of receiving input that defines a new form or manipulates an existing form. The form design interface is also capable of simulating the display of an existing form. User interface module 350 is further configured to provide a data reporting interface that receives input specifying a form interactivity metric that is to be analyzed, and optionally, a consumer segmentation upon which such analysis should be based. Still other interfaces can be implemented in other embodiments, including interfaces configured to display information to, and receive information from, form consumers 200.

The various interfaces generated by user interface module 350 can be rendered using hardware components associated with an end user's computer. Thus, for example, form author 100 can use input/output components associated with his/her computing device to leverage services provided by user interface module 350, and in particular, to display and interact with the user interfaces generated by user interface module 350. Examples of input/output components that can be used in this regard include a display, a keyboard, a pointing device, and a touch sensitive surface. Such components can be peripheral to an end user's computing device, or can be integrated into such device. In certain embodiments forms management system 300 is implemented in a client-server arrangement wherein at least some functionality, such as the functionality provided by user interface module 350, is provided to form author 100 using an applet (for example, a JavaScript applet) or other downloadable module. Such a remotely-provisioned module can be provided in real-time in response to a request from form author 100 for access to functionality associated with a particular user interface.

Referring again to the example embodiment illustrated in FIG. 2, forms management system 300 further comprises a form simulation module 360 that, in turn, comprises an add dimension sub-module 362 and a transform dimension sub-module 364. In such embodiments form simulation module 360 is configured to simulate the appearance of an authored form and receive user input selecting designated form fields. More specifically, add dimension sub-module 362 is configured to receive input from form author 100 designating selected form fields as dimensions for subsequent interaction analysis, as will be described in turn. Likewise, transform dimension sub-module 364 is configured to transform a designated field using a user specified customized segmentation. For example, a numerical "household income" field can be transformed into low-, middle-, and high-income consumer segments. As in the case of user interface module 350, the various interfaces generated by form simulation module 360 can be rendered using hardware components associated with an end user's computer, and in particular, with a computer used by form author 100.

In certain embodiments forms management system includes a consumer data processing module 370. Consumer data processing module 370 is configured to receive, process, and optionally respond to, data entered into a form by consumers 200. For instance, in one particular implementation when consumers 200 submit completed forms, consumer data processing module 370 stores the received data in form data repository 600 and invokes one or more form workflows 700. Example form workflows 700 include sending an email message, processing a payment, or packaging a shipment. Thus in such embodiments form data repository 600 can be understood as the storage point for data that is collected via the form and that is used by workflows 700.

In certain embodiments consumer data processing module 370 is also configured to observe and receive data characterizing consumer interaction with a form. Examples of such consumer interaction data include observations of the time it takes to complete a form, the generation of an error message while completing a form, the receipt of a help request while interacting with a form, the saving of an interim form state, the submission of a form, and the abandonment of a form before final submission. Consumer interaction data can be stored local to forms management system 300 and/or in a networked storage repository, such as in analytics data repository 800. The particular type of consumer interaction data that is observed can be designated by form author 100 as part of the form authoring process. Thus an authored from may include embedded executable code that transparently leverages functionality associated with consumer data processing module 370 while consumers 200 interact with the form.

To provide a more specific example, in one embodiment consumer data processing module 370 is configured to observe and record consumer interaction events in analytics data repository 800 along with metadata characterizing the observed interaction events. For instance, when a consumer requests help with an "Security PIN" field on a "Payment Submission" form, the recorded metadata may include information such as the name of the form ("Payment Submission"), the field associated with the observed event ("Security PIN"), and the observed event ("Help Request"). In addition, where form author 100 has designated certain fields as dimensions for form interaction analysis, the values associated with such dimensions can be recorded in analytics data repository 800 as well. For instance, where form author previously designated "Credit Card Type" as a dimension, the type of credit card selected by the consumer can also be recorded as being associated with the observed help request. This allows form author to better understand which types of credit card holders are most likely to request help with the "Security PIN" field of the "Payment Submission" form. Such dimensions can be subject to custom transformations, as will be described in turn.

Still referring to the example embodiment illustrated in FIG. 2, forms management system 300 further comprises a report filtering module 380 that, in turn, comprises a help report sub-module 384, a time report sub-module 386, and an error report sub-module 388. Other types of reporting sub-modules, such as an interim state storage report sub-module, a form submission report sub-module, or a form abandonment report sub-module, can be included in other embodiments. Report filtering module 380 is configured to generate a data reporting interface that includes form interactivity metric data. Such data is optionally segmented based on specified dimensions designed by form author 100, as described herein. One example of a form interactivity metric that can be revealed in the data reporting interface is a quantity and/or rate of help requests as determined by help report sub-module 384. Such a report allows form author 100 to understand which consumer segments tend to request help while interacting with an authored form. Another example of a form interactivity metric that can be revealed in the data reporting interface is a report indicating the amount of time spent interacting with a form subsection, as determined by time report sub-module 386. Such a report allows form author 100 to understand which form subsections are most burdensome for consumers 200. Yet another example of a form interactivity metric that can be revealed in the data reporting interface is a quantity and/or rate of errors produced as determined by error report sub-module 388. Such a report allows form author 100 to understand which consumer segments frequently encounter errors while interacting with an authored form. In general, such reports provide form author 100 with more detailed information with respect to how certain consumer segments interact with a particular form, and thus enables form author 100 to create a more efficient and intuitive consumer experience.

The embodiments disclosed herein can be implemented in various forms of hardware, software, firmware, or special purpose processors. For example, in one embodiment a non-transitory computer readable medium has instructions encoded thereon that, when executed by one or more processors, cause one or more of the digital form management and analysis methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into a variety of different software applications, such as form authoring applications, document management systems, workflow management systems, document viewers, market analysis systems, word processing applications, and desktop publishing applications. For example, a form authoring application can be configured to interface with forms management system 300, thereby allowing the form authoring application to leverage the services provided by form management system 300. The computer software applications disclosed herein may include a number of different modules, sub-modules, or other components of distinct functionality, and can provide information to, or receive information from, still other components and services. These modules can be used, for example, to communicate with peripheral hardware components, integrated hardware components, networked storage resources such as analytics data repository 800, or other external components and/or resources, such as form workflows 700. More generally, other components and functionality not reflected in the illustrations will be apparent in light of this disclosure, and it will be appreciated that the present disclosure is not intended to be limited to any particular hardware or software configuration. Thus in other embodiments the components illustrated in FIG. 2 may comprise additional, fewer, or alternative subcomponents.

The aforementioned non-transitory computer readable medium may be any suitable medium for storing digital information, such as a hard drive, a server, a flash memory, or random access memory. In alternative embodiments, the computer and modules disclosed herein can be implemented with hardware, including gate level logic such as a field-programmable gate array, or alternatively, a purpose-built semiconductor such as an application-specific integrated circuit. Still other embodiments may be implemented with a microcontroller having a number of input and output ports for receiving and transmitting data, respectively, and a number of embedded routines for carrying out the various functionalities disclosed herein. It will be apparent that any suitable combination of hardware, software, and firmware can be used, and that the present disclosure is not intended to be limited to any particular system architecture. As used in this disclosure, the term "non-transitory" excludes transitory forms of signal transmission.

Methodology

FIG. 3 is a flowchart illustrating an example form publication and submission method 1000 that can be used by form author 100 to designate a selected field as a dimension for subsequent analysis of how consumers 200 interact with an authored form. FIG. 4 is a flowchart illustrating an example form interaction analysis method 2000 that can be used by form author 100 to display segmented form interactivity data on an authored form. As can be seen, form publication and submission method 1000 and form interaction analysis method 2000 each include a number of phases and sub-processes, the sequence of which may vary from one embodiment to another. However, when considered in the aggregate, these phases and sub-processes form a complete form authoring process that is responsive to user commands in accordance with certain of the embodiments disclosed herein. These methodologies can be implemented, for example, using the system architecture illustrated in FIG. 2. However other system architectures can be used in other embodiments, as will be apparent in light of this disclosure. To this end, the correlation of the various functionalities shown in FIGS. 3 and 4 to the specific components illustrated in FIG. 2 is not intended to imply any structural and/or use limitations. Rather, other embodiments may include varying degrees of integration where multiple functionalities are performed by one system or by separate systems. For instance, in an alternative embodiment a single user interface module can be used to render a form and receive author input designating selected fields as dimensions for subsequent interaction analysis. Thus other embodiments may have fewer or more modules and/or sub-modules depending on the granularity of implementation. Numerous variations and alternative configurations will be apparent in light of this disclosure.

Figure 5A:
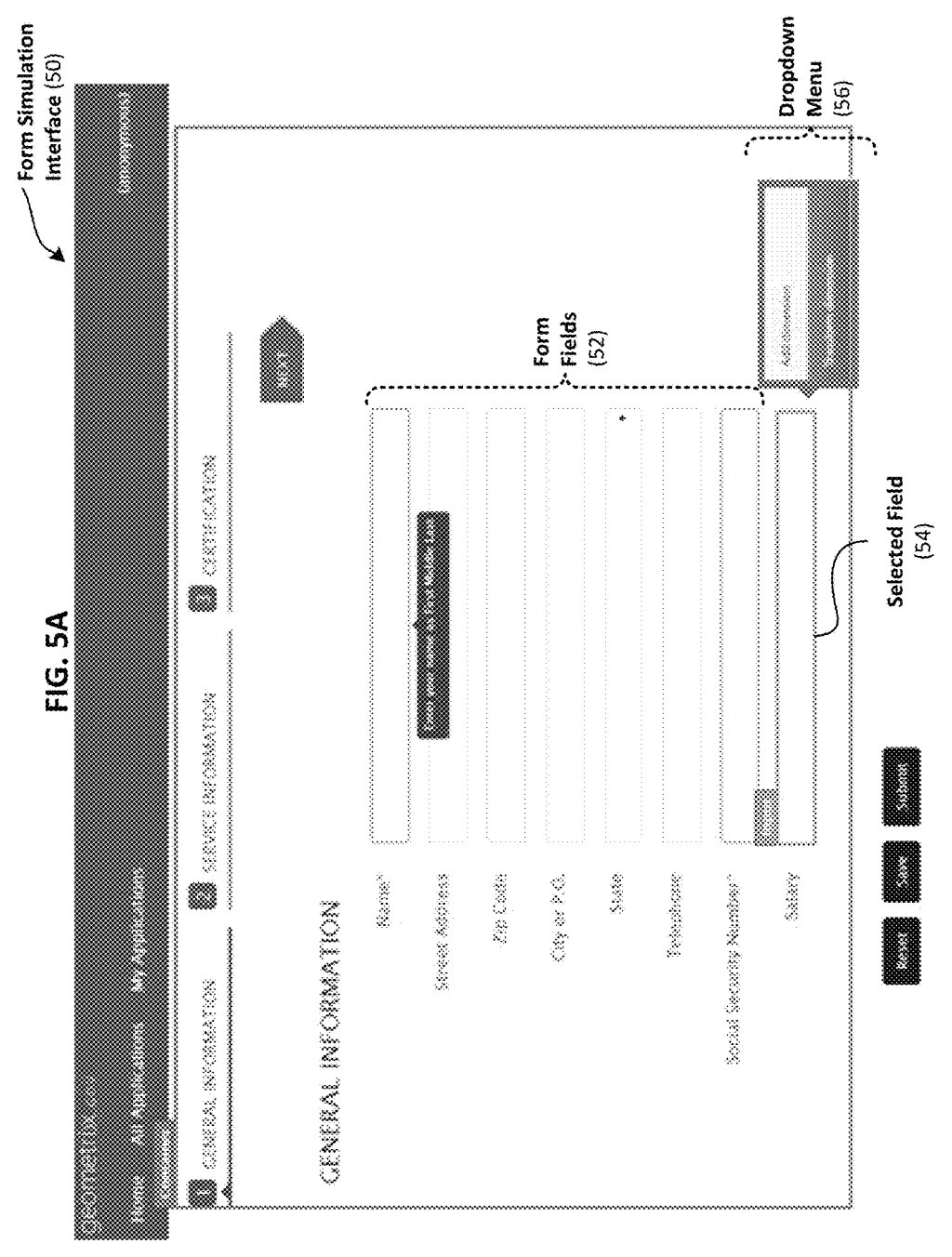
Figure 5B:
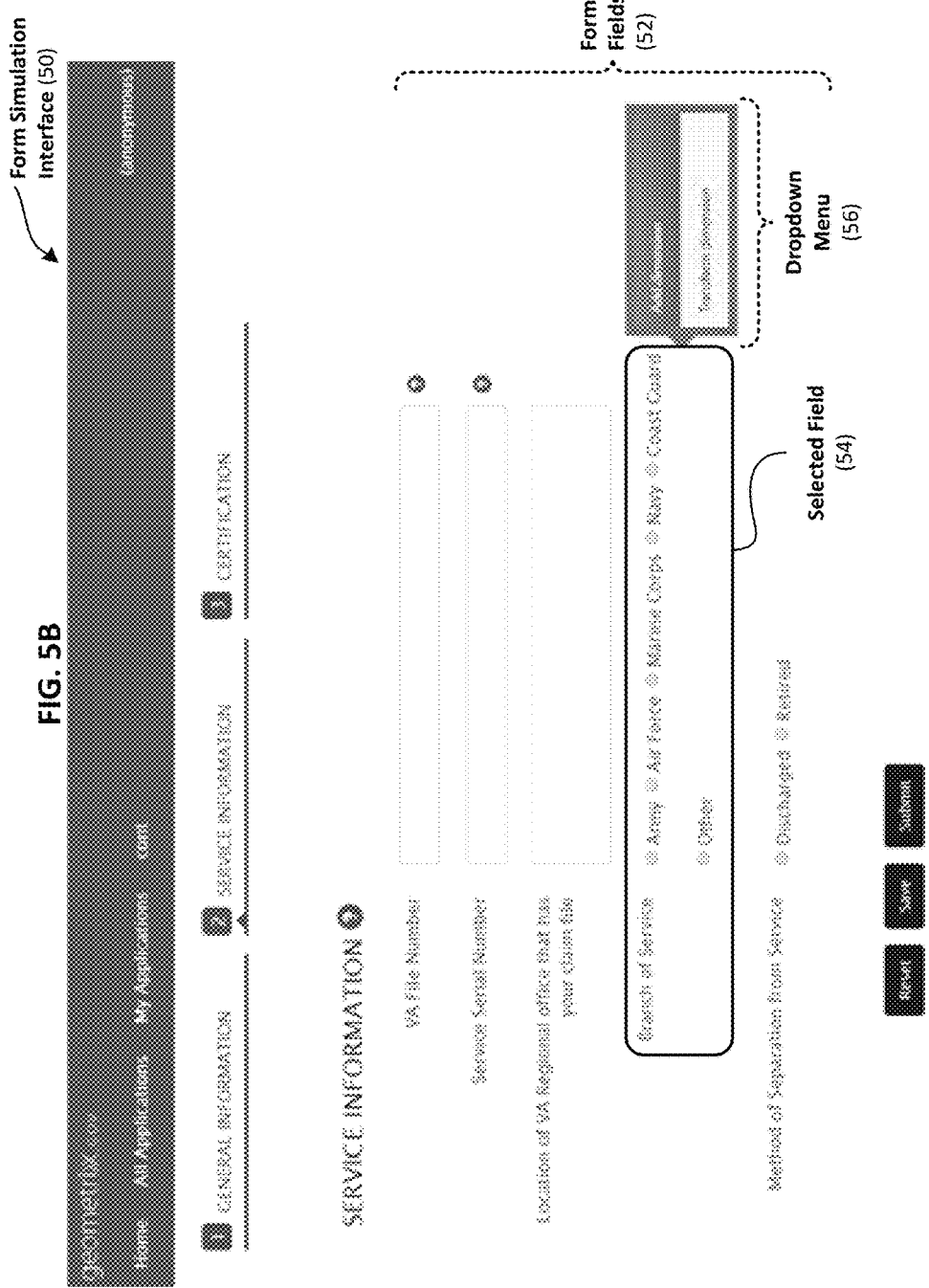

In one implementation, example form publication and submission method 1000 commences with user interface module 350 rendering a form in a form simulation interface. See reference numeral 1100 in FIG. 3. In general, the form simulation interface can be understood as replicating how the form will appear when rendered for consumers 200. FIG. 5A is a screenshot illustrating an example form simulation interface 50 for a form that is configured to collect demographic information from consumers 200. In particular, demographic information such as name, address, telephone number, social security number, and salary is collected via a plurality of form fields 52. Other types of information is collected in other embodiments. For example, FIG. 5B is a screenshot illustrating an example form simulation interface 50 for a form that is configured to collect service information from consumers 200. In certain embodiments form simulation interface 50 provides functionality that allows form author to manipulate the form appearance and functionality. In such embodiments a first input received from a form author can be considered to be input that manipulates the appearance of a digital for by, for example, adding, modifying, or removing the various elements that comprise the form. See reference numeral 1150 in FIG. 3.

Form simulation interface 50 provides additional functionality beyond replicating the form appearance and allowing a form author to manipulate such appearance. For example, in certain embodiments add dimension sub-module 362 of form simulation module 360 is configured to receive input from a form author designating a selected field 54 as a dimension for subsequent interaction analysis. See reference numeral 1200 in FIG. 3. Thus in certain embodiments a second input received from a form author can be considered to be input that designates selected field 54 as a dimension for subsequent interaction analysis. Selected field 54 can be indicated by clicking on, tapping, hovering over, or otherwise selecting one of the plurality of form fields 52. Once selected, a dropdown menu 56 is rendered. One of the selections available in the dropdown menu is "Add dimension". Invoking this menu option causes selected field 54 to be designated as a dimension for subsequent interaction analysis. Added fields are optionally indicated visually in form simulation interface 50 using highlighting, marking, coloring, outlining, or any other suitable visual feedback that allows the form author to easily identify such fields. Such visual marking is visible to form authors in form simulation interface 50, but is generally not visible to consumers who are filling out or otherwise interacting with the form. This is because consumers are unconcerned with which fields have been added as dimensions for consumer interaction analysis.

Designating a particular form field as an added dimension for consumer interaction analysis does not require appending code to or otherwise modifying the form itself. Rather, in certain embodiments such a designation results in modification of metadata that corresponds to the designated field. Such metadata can be stored in, and managed by, forms management system 300. For example, in one implementation a field node associated with the designated form field is augmented with a Boolean specifying that the field is configured as a custom analytics dimension. One example of such a Boolean is {isCustomDimension: true}. This Boolean causes data associated with the designated field to be captured with each analytics event, thus allowing the form author to later filter reports and define consumer segments when analyzing how consumers interact with the form.

Certain added dimensions are well-suited for segmentation without any transformation. For example, form fields such as gender, ethnicity, and nationality are often configured to have a finite number of possible responses from which consumers 200 may select. Data for such fields is often solicited via user interface elements such as dropdown menus and radio buttons, as contrasted with freeform alphanumeric entry. The finite set of valid responses for such dimensions can be understood as directly corresponding to a finite set consumer segmentations. For example, a gender field may prompt consumers 200 to choose between male and female. These two choices define two different segments of the consumer population. If form author 100 wishes to analyze differences between how male and female consumers interact with the form, the data collected via the gender field does not need to be transformed. Another example of a form field that is well-suited for segmentation without any transformation is the Branch of Service field illustrated as being selected in FIG. 5B.

However, other dimensions should be subject to some transformation as a prerequisite to meaningful segmentation analysis. For example, a salary form field may have an essentially unlimited number of valid responses. In this case, it can be useful to segment the consumer population into groups such as low-income consumers, middle-income consumers, and high-income consumers, wherein such segmentation is based on the values received via the salary form field. For instance, a low-income consumer segment can be defined as consumers having a salary less than $50,000, a middle-income consumer segment can be defined as consumers having a salary from $50,000 to $100,000, and a high-income consumer segment can be defined as consumers having a salary greater than $100,000. Such a segmentation enables more meaningful analysis of how salary affects how consumers interact with a form. The process of transforming the numerical salary data into the segmented income level data can be understood as one type of customized transformation of the salary dimension. Other segmentations may be possible in other embodiments. For example, even dimensions associated with a finite number of valid choices (such as country or postal code) can be transformed into a smaller number of customized segments (such as continent or geographic region). In addition, a customized transformation optionally leverages other dimensions, thus allowing compound segments to be defined, such as teenagers from California or retirees from Florida.

Figure 5C:
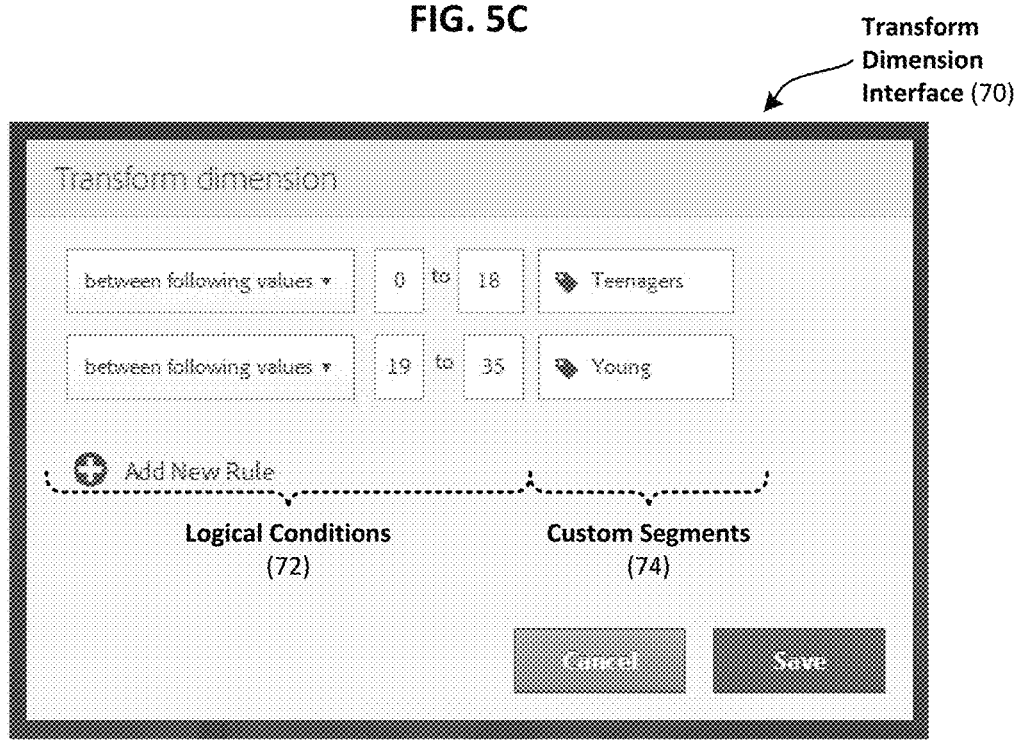
FIG. 5C is a screenshot illustrating an example transform dimension interface that allows a form author to define a custom segmentation based on data collected from a field designated as a dimension for subsequent consumer interaction analysis.

Therefore in some implementations form author 100 may wish to transform the dimension corresponding to selected field 54. Thus, transform dimension sub-module 364 of form simulation module 360 is optionally configured to transform the designated dimension using a customized segmentation. See reference numeral 1400 in FIG. 3. Such functionality can be accessed by selecting the "Transform dimension" option in dropdown menu 56, as illustrated in FIG. 5A. In one implementation invoking this menu option causes a transform dimension user interface to be displayed. FIG. 5C is a screenshot illustrating an example transform dimension interface 70 that allows form author to define a custom segmentation based on data collected from a field designated as a dimension for consumer interaction analysis. In general, transform dimension interface 70 allows form author to correlate a logical condition 72 with a custom segment 74. For example, the example transform dimension interface 70 illustrated in FIG. 5C can be used to transform an "Age" field into a "Teenagers" segment (including consumers between zero and eighteen years old) and a "Young" segment (including consumers between nineteen and thirty-five years old). Such a transformation would allow the form author to later separately analyze how teenagers and young people interact with the form.

Once form author 100 has designated appropriate fields as dimensions for subsequent interaction analysis, and has optionally transformed such dimensions using customized segmentations, the form is ready for publication. Consumers 200 can access and interact with a published form in a variety of ways, including by accessing the form via a webpage or opening the form using a document viewing application. As consumers 200 interact with the form, they can submit data, request help, save interim states, and take other appropriate actions. In the course of such interaction, consumer data processing module 370 is configured to receive consumer data provided via the form. See reference numeral 1510 in FIG. 3. Such consumer data can be provided as a result of consumers 200 filling in or otherwise interacting with the various fields comprising the form. Such data can be stored in form data repository 600. Consumer data processing module 370 is also configured to receive consumer interaction data and store such data in analytics data repository 800. See reference numeral 1520 in FIG. 3. For example, consumer data processing module 370 can be configured to record events such as form rendering events, data lookup events, data submission events, interim save events, help request events, and error generation events. Consumer data processing module 370 can additionally or alternatively be configured to monitor and record the amount of time consumers 200 spend interacting with a form or one or more form subsections. Detected events corresponding to a consumer interaction with the form are associated with data collected via the form, and more specifically, are associated with data collected via the form fields previously designated as added dimensions. See reference numeral 1600 in FIG. 3.

In certain implementations, in response to a consumer interaction event, such as the generation of a data validation error message or the receipt of a help request, consumer data processing module 370 is configured to generate a payload that includes data collected from a consumer for a designated field. Such collected data is optionally transformed based on a customized segmentation, as described herein. For instance, the example "Enrollment Form" illustrated in FIG. 5A is configured to collect demographic data using "name", "state", and "salary" fields. The form author designated the state and salary fields as dimensions for subsequent consumer interaction analysis. The form author further transformed the salary field according to a custom segmentation wherein a "low-income" consumer segment comprises consumers having a salary less than $50,000, a "middle-income" consumer segment comprises consumers having a salary from $50,000 to $100,000, and a "high-income" consumer segment comprises consumers having a salary greater than $100,000. If a consumer interaction event, such as a data validation error or a help request, is triggered on the name field, consumer data processing module 370 can be configured to generate a payload characterizing such event.

For example, FIG. 8 illustrates a table 3000 listing example payloads for various consumer interaction events triggered from the Enrollment Form of FIG. 5A, wherein certain fields (or no fields) are designated as added dimensions for purposes of analyzing such events. The first example payload illustrated in FIG. 8 indicates that the validation failure error on the name field was generated in response to an interaction with a California resident having a middle-income salary. The second example payload illustrated in FIG. 8 was generated in the absence of any fields designated as added dimensions. As illustrated, failure to designate the state and salary fields results in a payload that includes no information regarding the state or salary of the user that caused the validation failure error to occur. The third example payload illustrated in FIG. 8 indicates that a California resident having a middle-income salary requested help with the name field. The fourth example payload illustrated in FIG. 8 indicates that a California resident spent 35 seconds completing the name field.

In general, data aggregated using payloads such as those illustrated in FIG. 8 can provide insight into which consumer segments tend to encounter data validation errors or tend to request help more frequently. This allows a form author to make targeted improvements to the form to reduce the occurrence of such errors. In one example embodiment, the data characterizing the consumer interaction with the form is stored in analytics data repository 800. In one implementation the payload itself is stored in analytics data repository 800, while in an alternative embodiment analytics data extracted from the payload is stored. Failure to designate a particular field as a dimension prevents data collected using that field from being associated with a form interactivity metric. The data actually collected from the consumer via the form fields is saved in form data repository 600.

In addition to receiving consumer data and consumer interaction data, consumer data processing module 370 is optionally further configured to process one or more form workflows 700. See reference numeral 1700 in FIG. 3. Such workflows can leverage either the actual received data stored in form data repository 600, the analytical data stored in analytics data repository 800, or both. In addition, such workflows, which may be defined by form author 100, may involve actions such as sending a message, processing a payment, or packaging a shipment, and may be orchestrated by other networked computer systems. Consumer data processing module 370 stores the received consumer data, and optionally the received consumer interaction data, in form data repository 600. See reference numeral 1800 in FIG. 3. This allows such data to be leveraged by a subsequent form interaction analysis method 2000. The form publication and submission method 1000 illustrated in FIG. 3 can be applied to receive consumer data from a large quantity of consumers 200 based on a single authored form.

Once a number of consumers 200 have interacted with an authored form, form author 100 can invoke form interaction method 2000 to analyze such interactions. In one implementation, form interaction method 2000 commences with user interface module 350 rendering a form that is to be analyzed in a data reporting interface. See reference numeral 2100 in FIG. 4. In general, the data reporting interface can be understood as replicating how the form appears when rendered for consumers 200, but also further includes data characterizing how consumers 200 interact with the form. FIG. 6 is a screenshot illustrating an example data reporting interface 60 for a form that is configured to collect service information from veterans of the armed services. For example, the form illustrated in FIG. 6 includes text entry fields corresponding to, among other things, a consumer's Veterans Affairs (VA) File Number and Service Serial Number. This form also includes radio buttons which can be used to select a consumer's Branch of Service and Method of Separation from Service, both of which are previously-designated analytical dimensions 66. Such designation can be performed by form author 100, for example using form publication and submission method 1000 illustrated in FIG. 3 and described herein. In some implementations data reporting interface 60 is configured such that designated analytical dimensions 66 are indicated with a different color, a surrounding box, or some other visual indicator, thereby providing form author 100 with information regarding the different ways in which consumers 200 may be segmented. For example, FIG. 6 illustrates a designation box 66' surrounding designated analytical dimensions 66, thus indicating to form author that consumers can be segmented based on data collected using these fields. In other implementations additional or fewer fields can be so designated.

Referring again to the flowchart of FIG. 4 and the screenshot of FIG. 6, user interface module 350 is further configured to receive input from form author 100 designating a form interactivity metric that is to be analyzed. See reference numeral 2210 in FIG. 4. Such a designation can be accomplished, for example, using a report type selector 62. In such embodiments report type selector 62 comprises a user interface element that allows form author 100 to choose between various form interactivity metrics that are to be analyzed. While a button user interface element is illustrated in FIG. 6, in other embodiments other selection elements, such as radio buttons or dropdown menus, can be used. FIG. 6 illustrates that form author 100 has selected a help report type, thus indicating that form author 100 wishes to analyze the number of help requests submitted by various consumer segments (or by the entire consumer population) during the course of consumer interaction with the form.

In response to the designation of the form interactivity metric that is to be analyzed, consumer data processing module 370 generates form interactivity data based on such input. See reference numeral 2310 in FIG. 4. This may involve, for example, analyzing the collected consumer interaction data to quantify the number or rate of help requests generated during the course of consumer interaction with the displayed form. This may also involve analyzing the collected consumer interaction data to quantify an average time that each consumer spends interacting with the displayed form. Data corresponding to other form interactivity metrics can be generated in other embodiments. Once generated, report filtering module 380 can be configured to render the data in data reporting interface 60. See reference numeral 2400 in FIG. 4. For example, FIG. 6 illustrates help request counts 64 displayed adjacent to the VA File Number and Service Serial Number fields, thereby providing form author 100 with an indication of how often consumers 200 request help with these fields. Report type selector 62 can be used to display data associated with other form interactivity metrics. Thus, for example, selecting the "Errors" report type selector causes error generation counts to be displayed instead of help request counts 64. This allows form author to quickly switch between analyzed form interactivity metrics directly from data reporting interface 60.

FIG. 6 illustrates data reporting interface 60 displaying help request counts 64 for an entire consumer population. In some cases form author 100 may wish to segment these statistics, and view form interactivity metrics for only a particular segment of the consumer population. Thus in certain embodiments user interface module 350 is optionally configured to receive input from form author 100 designating a consumer segmentation. See reference numeral 2220 in FIG. 4. Such designation can be accomplished by form author 100 directly interacting with the various elements that are rendered in data reporting interface 60. For example, if form author 100 wishes to view a form interactivity metric for only Army veterans, then he/she can make a corresponding selection from designated analytical dimensions 66 appearing in data reporting interface 60. Likewise if form author 100 wishes to view a form interactivity metric for only retired service members, as opposed to discharged service members. Composite segmentations, such as only discharged Navy veterans, can also be designated in similar fashion.

The foregoing makes clear that data reporting interface 60 can be understood as not only reporting information with respect to designated form interactivity metrics, but also as providing an intuitive way for form author 100 to define a custom segmentation. Thus designated analytical dimensions 66 enable form author 100 to apply various filters used to specify help request counts 64. In such embodiments the filters are applied based on, for example, data stored in a payload that includes data received via a form field designated as an added dimension, as described herein. For instance, the first, third, and fourth example payloads illustrated in FIG. 8 include data extracted from designated fields which can serve as the basis for subsequent consumer segmentation filtering. Thus in certain embodiments the input that defines a reported consumer segment, which is received from the form author in data reporting interface 60, results from selection of a field that was previously designated as an added dimension for form interaction analysis in form simulation interface 50.

In response to the designation of the desired segmentation, consumer data processing module 370 generates segmented form interactivity data based on such input. See reference numeral 2320 in FIG. 4. This can be accomplished by quantifying certain consumer interaction events (for instance, help requests) for only those payloads that specify a particular field value (for instance, a particular branch of service). Report filtering module 380 then renders such data in data reporting interface 60. In some cases error generation counts 65 or other consumer interaction events are displayed using a different color that indicates abnormally high values, thus further calling the attention of form author 100 to outliers. For example, in one implementation error generation or help request values that exceed a designated threshold are indicated with a red background. The designated threshold can be an absolute value or a relative value, such as a relative value that exceeds an average value by a designated amount.

For example, FIG. 7A illustrates error generation counts 65 for the VA File Number and Service Serial Number fields, segmented by retired Army veterans. To this end, FIG. 7A illustrates that form author 100 has selected "Army" and "Retired" from designated analytical dimensions 66. Likewise, FIG. 7B illustrates error generation counts 65 for the same fields, but instead segmented by retired Coast Guard veterans. To this end, FIG. 7B illustrates that form author 100 has selected "Coast Guard" and "Retired" from designated analytical dimensions 66. Taken together, these segmentations reveal that retired Coast Guard veterans have an abnormally high error generation rate for the VA File Number field, thus suggesting an aspect of the form which might be evaluated for possible improvement. More specifically, these insights might lead the form author to modify the form such that it includes further instructions explaining where Coast Guard veterans can locate their VA File Number. Because existing solutions do not allow the form author to separately quantify errors generated by Coast Guard and Army veterans, the abnormally large number of errors received by Coast Guard veterans would either be understood as a problem with the form generally (that is, not specific to Coast Guard veterans), or would be overlooked altogether. In either case, it would be unlikely that the form author would have sufficient information to improve the form such that Coast Guard veterans receive fewer errors.

Data reporting interface 60 is an interactive interface that is capable of adapting to input received from form author 100. Thus, for example, a form author can modify or remove a customized segmentation by continuing to interact with designated analytical dimensions 66. In some cases designated analytical dimensions 66 may be located in a different form subsection, in which case data reporting interface 60 is configured to allow form author to navigate forward and backward in a form workflow to adjust the dimensions and view the resulting form interactivity metrics. Form author 100 may additionally or alternatively interact with report type selector 62 to change which metrics are displayed in data reporting interface 60. Thus, in general, user interface module 350 is configured to determine whether modified form author input is received and to respond to such modified input as described herein. See reference numeral 2500 in FIG. 4. For example, this allows form author 100 to compare the performance of two forms in a given geographical region by selecting the consumer segment corresponding to the given geographical region in each form.

In certain implementations data reporting interface 60 is configured to provide additional information not directly related to one of the data entry fields included in the analyzed form. In particular, data reporting interface 60 can additionally or alternatively be configured to provide information with respect to the form submission status for the entire population of consumers or some smaller segment thereof. For example, in the context of a multi-segment form that allows consumers to save their progress and submit the form at a later date, data reporting interface 60 can be used to view the form submission status for consumers having an annual salary that falls within a particular salary range. Interface 60 can also be used to view a conversion funnel that characterizes how consumers within a particular segment navigate toward form submission. The segmentation techniques disclosed herein can be complimented with global filters such as browser type, geographic location, and device type, thereby allowing form author 100 to visualize reports for a global filter exclusively, or for a global filter in combination with a filter provided by the form fields appearing in data reporting interface 60.

CONCLUSION

Numerous variations and configurations will be apparent in light of this disclosure. For instance one example embodiment provides a method for establishing custom analytics dimensions in a digital form authoring environment. The method comprises rendering a digital form in a form simulation interface. The digital form comprises a plurality of fields. The method further comprises receiving input from a form author via the form simulation interface. The input designates a selected one of the plurality of fields as a dimension for subsequent form interaction analysis. The method further comprises receiving consumer data provided using the selected one of the plurality of fields. The method further comprises receiving consumer interaction data characterizing a consumer interaction with the digital form. The method further comprises storing the consumer interaction data in an analytics data repository. The analytics data repository records a correlation between the consumer interaction and a consumer segment defined by the received consumer data. In some cases the consumer interaction data quantifies a parameter selected from a group consisting of (a) a time a consumer spends interacting with the digital form, (b) a number of help requests generated while the consumer interacts with the digital form, and (c) a number of errors generated as a result of the consumer interacting with the digital form. In some cases (a) multiple fields are designated as dimensions for subsequent form interaction analysis; (b) the received consumer data is provided using the multiple fields; and (c) the consumer segment is defined by the consumer data received via the multiple fields. In some cases the method further comprises (a) rendering the digital form in a data reporting interface; and (b) receiving, via the data reporting interface, a second input from the form author designating a form interactivity metric that is to be analyzed. In some cases the method further comprises (a) rendering the digital form in a data reporting interface; (b) receiving, via the data reporting interface, a second input from the form author designating a form interactivity metric that is to be analyzed; and (c) receiving, via the data reporting interface, a third input from the form author defining a reported consumer segment, wherein the third input results from selecting the field designated as the dimension for form interaction analysis in the form simulation interface. In some cases the method further comprises rendering the digital form in a data reporting interface; (b) receiving, via the data reporting interface, a second input from the form author designating a form interactivity metric that is to be analyzed; (c) receiving, via the data reporting interface, a third input from the form author defining a reported consumer segment, wherein the third input results from selecting the field designated as the dimension for form interaction analysis in the form simulation interface; and (d) rendering, in the data reporting interface, segmented form interactivity data adjacent to a form element associated with the designed form interactivity metric, wherein the segmented form interactivity data correlates the form interactivity metric with the reported consumer segment. In some cases the method further comprises receiving a second input from the form author via the form simulation interface, wherein the second input defines a customized transformation of the selected field, and wherein the customized transformation maps a range of values to the consumer segment.

Another example embodiment provides a digital form authoring system for designating custom analytics dimensions and rendering form interactivity metrics that are segmented based on the designated dimensions. The system comprises a form simulation module configured to render a digital form that comprises a plurality of fields in a form simulation interface that receives, from a form author, first input that designates a selected one of the plurality of fields as a dimension for subsequent form interaction analysis. The form simulation module is further configured to render the digital form in a data reporting interface that receives, from the form author, second input that designates a form interactivity metric and defines a consumer segmentation. The system further comprises a consumer data processing module configured to receive data provided from a consumer interacting with the selected one of the plurality of fields. The consumer data processing module is further configured to receive interaction data characterizing an interaction of the consumer with the digital form. The consumer data processing modules if further configured to assign a value to the form interactivity metric based on the interaction data. The system further comprises a report filtering module configured to modify the value assigned to the form interactivity metric based on the consumer segmentation. The modified value is rendered in the data reporting interface. In some cases the second input that defines the consumer segmentation comprises an interaction with the field designated as the dimension for subsequent form interaction analysis. In some cases the modified value is rendered in the data reporting interface in conjunction with a color that depends on whether the modified value exceeds a threshold value. In some cases the consumer data processing module receives the data from the consumer and the interaction data after the digital form is rendered in the form simulation interface, but before the digital form is rendered in the data reporting interface. In some cases the digital form is rendered in the form simulation interface before it is rendered in the data reporting interface. In some cases the digital form is rendered in the form simulation interface before and after it is rendered in the data reporting interface. In some cases first input designates more than one of the plurality of fields as separate dimensions for subsequent form interaction analysis. In some cases the form interactivity metric is selected from a group consisting of an error occurrence quantifier and a help request occurrence quantifier.

Another example embodiment provides a computer program product that, when executed by one or more processors, causes a segmented data analysis process to be carried out using a data reporting interface that simulates the appearance of a digital form. The process comprises rendering a digital form in a data reporting interface. The digital form comprises a plurality of form elements and a plurality of fields. At least one of the fields corresponds to a designated analytical dimension. The process further comprises receiving a first input from a form author designating a form interactivity metric that is to be analyzed. The process further comprises receiving a second input from the form author defining a consumer segmentation. The second input results from selecting at least one designated analytical dimension. The process further comprises generating, based on the first and second inputs, segmented form interactivity data that correlates the form interactivity metric with the defined consumer segmentation. The process further comprises rendering, in the data reporting interface, the segmented form interactivity data adjacent to a form element associated with the designated form interactivity metric. In some cases (a) the form element is a virtual button associated with a help request command; and (b) the form interactivity metric is a help request occurrence quantifier. In some cases the process further comprises (a) rendering the digital form in a form simulation interface after rendering the digital form in the data reporting interface; and (b) receiving input from the form author via the from simulation interface that manipulates an appearance of the digital form. In some cases the process further comprises (a) receiving consumer data provided using at least one of the form elements; (b) receiving consumer interaction data characterizing a consumer interaction with the digital form; and (c) storing the consumer interaction data in an analytics data repository, wherein the analytics data repository records a correlation between the consumer interaction and the defined consumer segmentation. In some cases the process further comprises (a) rendering the digital form in a form simulation interface before rendering the digital form in the data reporting interface; and (b) receiving input from the form author via the form simulation interface that designates a selected one of the plurality of fields as corresponding to the designated analytical dimension. In some cases the process further comprises (a) rendering the digital form in a form simulation interface before rendering the digital form in the data reporting interface; (b) receiving input from the form author via the form simulation interface that designates a selected one of the plurality of fields as corresponding to the designated analytical dimension; (c) receiving consumer data provided using the selected one of the plurality of fields; and (d) receiving consumer interaction data characterizing a consumer interaction with the digital form; in such case the consumer data and the consumer interaction data are received before rendering the digital form in the data reporting interface.

The foregoing detailed description has been presented for the purposes of illustration and description. It is not intended to be exhaustive or to limit the invention to the particular disclosed embodiments. Many modifications and variations are possible in light of this disclosure. Thus it is intended that the scope of the invention be limited not by this detailed description, but rather by the claims appended hereto.

What is claimed is:

1. A method for establishing custom analytics dimensions in a digital form authoring environment, the method comprising:
rendering a digital form in a form simulation interface, wherein the digital form comprises a plurality of fields;
receiving first input from a form author via the form simulation interface, wherein the first input designates a selected one of the plurality of fields as a dimension for subsequent form interaction analysis;
receiving consumer data provided using the selected one of the plurality of fields;
receiving consumer interaction data characterizing a consumer interaction with the digital form;
rendering the digital form in a data reporting interface;
receiving second input from the form author via the data reporting interface, wherein the second input designates a form interactivity metric;
assigning an initial value to the form interactivity metric based on the received consumer interaction data;
causing display of the initial value in the data reporting interface;
receiving third input from the form author via the selected field in the data reporting interface, wherein the third input defines a consumer segmentation;
modifying the initial value assigned to the form interactivity metric based on the consumer segmentation;
assigning a modified value to the form interactivity metric; and
causing display of the modified value for the form interactivity metric in response to receiving the third input.

2. The method of claim 1, wherein the consumer interaction data quantifies a parameter selected from a group consisting of (a) a time a consumer spends interacting with the digital form, (b) a number of help requests generated while the consumer interacts with the digital form, and (c) a number of errors generated as a result of the consumer interacting with the digital form.

3. The method of claim 1, wherein:
the first input designates multiple fields as dimensions for the subsequent form interaction analysis;
the received consumer data is provided using the multiple fields; and
the third input is received via the multiple fields.

4. The method of claim 1,
wherein the initial and modified values assigned to the form interactivity metric are displayed adjacent to the selected field in the data reporting interface.

5. The method of claim 1, further comprising receiving supplemental first input from the form author via the form simulation interface, wherein the supplemental first input defines a customized transformation of the selected field, and wherein the customized transformation maps a range of values to the consumer segmentation.

6. A digital form authoring system comprising:
a form simulation module configured to render a digital form that comprises a plurality of fields, wherein the form simulation module is configured to render the form in both:
(a) a form simulation interface that receives, from a form author, first input that designates a selected one of the plurality of fields as a dimension for subsequent form interaction analysis, and
(b) a data reporting interface that receives, from the form author, LU second input that designates a form interactivity metric and (ii) third input that defines a consumer segmentation, wherein the third input is provided via the selected field;
a consumer data processing module configured to
(a) receive data provided from a consumer interacting with the selected one of the plurality of fields,
(b) receive interaction data characterizing an interaction of the consumer with the digital form, and
(c) assign an initial value to the form interactivity metric based on the interaction data; and
a report filtering module configured to modify the initial value assigned to the form interactivity metric based on the consumer segmentation and assign a modified value to the form interactivity metric;
wherein the data reporting interface displays the initial value for the form interactivity metric and, in response to receiving the third input, displays the modified value for the form interactivity metric.

7. The system of claim 6, wherein the modified value is displayed in the data reporting interface in conjunction with a color that depends on whether the modified value exceeds a threshold value.

8. The system of claim 6, wherein the consumer data processing module receives the data from the consumer and the interaction data characterizing the interaction after the digital form is rendered in the form simulation interface, but before the digital form is rendered in the data reporting interface.

9. The system of claim 6, wherein the digital form is rendered in the form simulation interface before it is rendered in the data reporting interface.

10. The system of claim 6, wherein the digital form is rendered in the form simulation interface before and after it is rendered in the data reporting interface.

11. The system of claim 6, wherein the first input designates more than one of the plurality of fields as separate dimensions for the subsequent form interaction analysis.

12. A computer program product that, when executed by one or more processors, causes a segmented data analysis process to be carried out using a data reporting interface that simulates the appearance of a digital form, wherein the process comprises:
rendering a digital form in a form simulation interface, wherein the digital form comprises a plurality of fields;
receiving first input from a form author via the form simulation interface, wherein the first input designates a selected one of the plurality of fields as a dimension for subsequent form interaction analysis;
receiving consumer data provided using the selected one of the plurality of fields;
receiving consumer interaction data characterizing a consumer interaction with the digital form;
rendering the digital form in a data reporting interface;
receiving second input from the form author via the data reporting interface, wherein the second input designates a form interactivity metric;
assigning an initial value to the form interactivity metric based on the received consumer interaction data;
causing display of the initial value in the data reporting interface;
receiving third input from the form author via the selected field in the data reporting interface, wherein the third input defines a consumer segmentation;
modifying the initial value assigned to the form interactivity metric based on the consumer segmentation;
assigning a modified value to the form interactivity metric; and
causing display of the modified value for the form interactivity metric in response to receiving the third input.

13. The computer program product of claim 12, wherein the form interactivity metric is a help request occurrence quantifier.

14. The computer program product of claim 12, wherein the process further comprises:
rendering the digital form in the form simulation interface for a second time, wherein the digital form is rendered in the form simulation interface for the second time after rendering the digital form in the data reporting interface and causing display of the modified value; and
receiving fourth input from the form author via the from simulation interface that manipulates an appearance of the digital form, wherein the fourth input is received after the digital form is rendered in the form simulation interface for the second time.

15. The computer program product of claim 12, wherein the process further comprises:
storing the initial and modified values assigned to the form interactivity metric in an analytics data repository.

16. The computer program product of claim 12, wherein the
consumer data and the consumer interaction data are received before rendering the digital form in the data reporting interface.

17. The computer program product of claim 12, wherein the consumer interaction data quantifies a parameter selected from a group consisting of (a) a time a consumer spends interacting with the digital form, (b) a number of help requests generated while the consumer interacts with the digital form, and (c) a number of errors generated as a result of the consumer interacting with the digital form.

18. The computer program product of claim 12, wherein:
the first input designates multiple fields as dimensions for the subsequent form interaction analysis;
the received consumer data is provided using the multiple fields; and
the third input is received via the multiple fields.

19. The computer program product of claim 12, wherein the initial and modified values assigned to the form interactivity metric are displayed adjacent to the selected field in the data reporting interface.

20. The computer program product of claim 12, wherein the process further comprises receiving supplemental first input from the form author via the form simulation interface, wherein the supplemental first input defines a customized transformation of the selected field, and wherein the customized transformation maps a range of values to the consumer segmentation.

* * * * *